United States Patent
Ozeki

[11] Patent Number: 6,039,334
[45] Date of Patent: Mar. 21, 2000

[54] RACK AND PINION STEERING DEVICE

[75] Inventor: Keita Ozeki, Ichinomiya, Japan

[73] Assignee: TRW Steering Systems Japan Ltd., Aichi-Ken, Japan

[21] Appl. No.: 09/156,785

[22] Filed: Sep. 17, 1998

[30] Foreign Application Priority Data

Sep. 29, 1997 [JP] Japan ..................... 9-264001

[51] Int. Cl.[7] .................. B62D 5/22; B62D 7/22
[52] U.S. Cl. .................. 280/93.514; 280/93.515
[58] Field of Search .................. 280/93.514, 771, 280/93.51, 93.502, 93.52; 180/428

[56] References Cited

U.S. PATENT DOCUMENTS

| | | | |
|---|---|---|---|
| 1,119,703 | 12/1914 | Jubak et al. | 280/93.514 |
| 3,605,933 | 9/1971 | Millard | 180/428 |
| 4,172,507 | 10/1979 | Millard | 180/428 |
| 4,588,198 | 5/1986 | Kanazawa et al. | 280/90 |
| 4,630,701 | 12/1986 | Venetjoki | 180/209 |
| 4,815,552 | 3/1989 | James | 180/428 |
| 4,819,499 | 4/1989 | Morell | 74/498 |
| 4,838,106 | 6/1989 | Adams | 74/388 |
| 4,887,683 | 12/1989 | Klosterhaus et al. | 180/428 |
| 5,082,077 | 1/1992 | Holka | 180/447 |

FOREIGN PATENT DOCUMENTS 2591986  6/1987  France ..................... 280/771

Primary Examiner—Brian L. Johnson
Assistant Examiner—Michael Britton
Attorney, Agent, or Firm—Tarolli, Sundheim, Covell, Tummino & Szabo L.L.P.

[57] ABSTRACT

A rack and pinion steering device which reduces the generation of unusual sounds or vibrations. An auxiliary shaft (36) is slidably supported by a pair of bearings (32) and (34). The pair of bearings are arranged parallel to a rack shaft (10) at a predetermined interval on a device unit (1) which supports the rack shaft (10) in such a manner that the rack shaft (10) can reciprocate. A spherical portion (60) is formed on the end of the rack shaft (10) and swingably engaged in a connecting member (58) to interconnect the end of the rack shaft (10) and the connecting member (58). The end of the auxiliary shaft (36) is also fixed to the connecting member (58), and opposite tie rods (38) and (40) are connected to the auxiliary shaft (36) between a pair of bearings (32) and (34) via ball joints (42) and (44).

12 Claims, 3 Drawing Sheets

RACK AND PINION STEERING DEVICE

BACKGROUND OF THE INVENTION (i) Field of the Invention

The present invention relates to a rack and pinion steering device which converts the rotary motion of a steering wheel into a linear motion for turning, via tie rods, a set of wheels.

(ii) Description of the Related Art

In a conventional rack and pinion steering device, as shown in FIG. 3, a rack shaft 100 is slidably supported by a device unit 102, and a piston 104, attached to one end of the rack shaft 100, is slidably inserted into a cylinder tube 106. By the rotation of a steering wheel (not shown), an input shaft 108 is rotated, causing the rotary motion to be converted into the linear motion of the rack shaft 100 by a rack and pinion mechanism 110. This conversion to the linear motion of the rack shaft 100 is assisted by a hydraulic pressure being applied to the piston 104 in accordance with the rotating direction of the steering wheel.

Further provided is a slit 112, formed along an axial length of the device unit 102, and a key member 114, which is attached to the rack shaft 100 and is slidably engaged in the slit 112. Attached to the key member 114, via ball joints 120 and 122, are opposite tie rods 116 and 118. Additionally, bellows 124 are provided around the device unit 102 to cover the slit 112.

In order to allow the key member 114 to slide in the slit 112, a moderate clearance is necessary between the key member 114 and the inner wall of the slit 112. Furthermore, a moderate clearance is also required for the engagement between a rack and a pinion (not shown) in the rack and pinion mechanism 100.

However, in the above mentioned conventional device, a counter-rotary moment is exerted on the rack shaft 100, via the opposite tie rods 116 and 118, by the kickback of the wheels, and the reaction of the steering wheel at the time of operation. As such, this counter-rotary moment is received by the key member 114 engaged in the slit 112. Thus, a problem is caused because the counter-rotary moment received by the key member 114 results in the generation of unusual sounds and vibrations, in some cases, due to the necessary clearance required in the rack and pinion mechanism.

SUMMARY OF THE INVENTION

Wherefore, it is an object of the present invention to provide a rack and pinion steering device which minimizes the generation of unusual sounds and vibrations.

More specifically, it is an object of the present invention to provide a rack and pinion steering device for converting a rotary motion of a steering wheel into a linear motion, by a rack and pinion mechanism, and for turning a set of wheels, via opposite tie rods, by the linear motion of a rack shaft in which the generation of unusual sounds and vibrations are minimized. In one illustrative embodiment of the present invention, there is provided an auxiliary shaft slidably supported parallel to a rack shaft, where ends of the auxiliary shaft and the rack shaft are interconnected by a connecting member, and opposite tie rods are connected to the auxiliary shaft. In a preferred invention, the auxiliary shaft is slidably supported by a pair of bearings which are arranged at a predetermined interval on the device unit, and the tie rods and the auxiliary shaft are interconnected between the pair of bearings. However, it is to be appreciated that the auxiliary shaft may be slidably supported by the device unit in any manner that allows the rack shaft to reciprocate.

Additionally, it is to be appreciated that a spherical portion may be formed on the end of the rack shaft and swingably engaged in the connecting member to interconnect the end of the rack shaft and the connecting member. Furthermore, the tie rods and the auxiliary shaft may be interconnected by ball joints having spherical portions disposed along the axial lines of the tie rods.

BRIEF DESCRIPTION OF THE DRAWINGS

Further objects and advantages of the present invention will become apparent from the following description of a preferred embodiment taken in conjunction with the accompanying drawings, wherein.

DETAILED DESCRIPTION OF THE PREFERRED EMBODIMENTS

Figure 1:
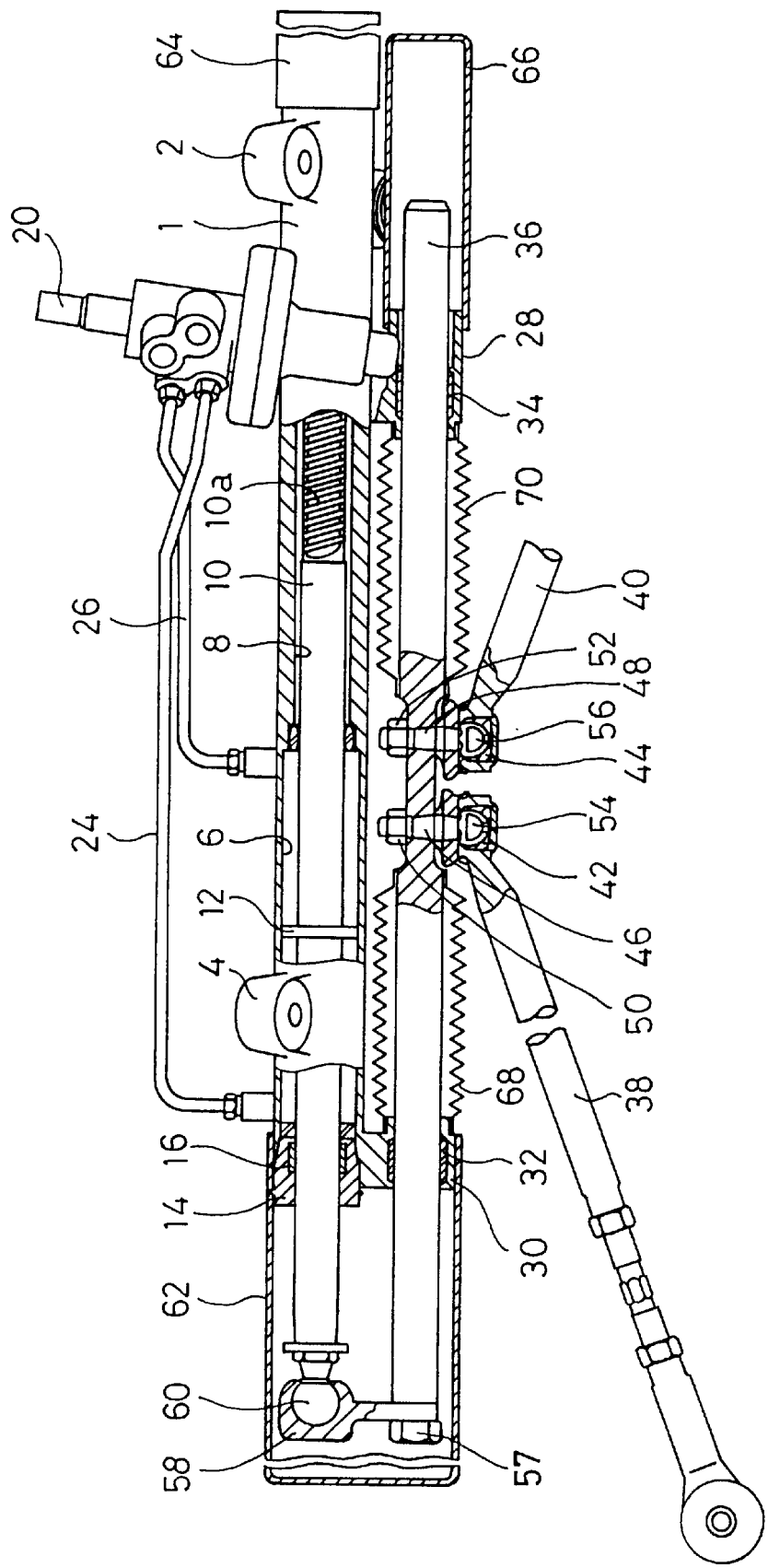
FIG. 1 is a partial sectional view showing a rack and pinion steering device according to an embodiment of the invention.

As shown in FIG. 1, numeral 1 denotes a device unit having a pair of mounting bases 2 and 4, formed at an predetermined interval on the device unit 1. The device unit 1 has an insertion hole 8, by which a rack shaft 10 is inserted into a sliding hole 6 formed adjacent to the insertion hole 8 in the device unit 1.

In the sliding hole 6 a piston 12, attached to the rack shaft 10, is slidably housed. At an opening to sliding hole 6 an end member 14, surrounding the rack shaft 10, is inserted into the opening to close and seal the sliding hole 6. The end member 14 surrounds the rack shaft 10 in a manner allowing the rack shaft 10 to pass through the end member 14 to protrude outside the sealed opening of sliding hole 6. Additionally, the end member 14 supports the rack shaft 10 by an inserted bearing 16 which allows the rack shaft 10 to move linearly.

Figure 2:
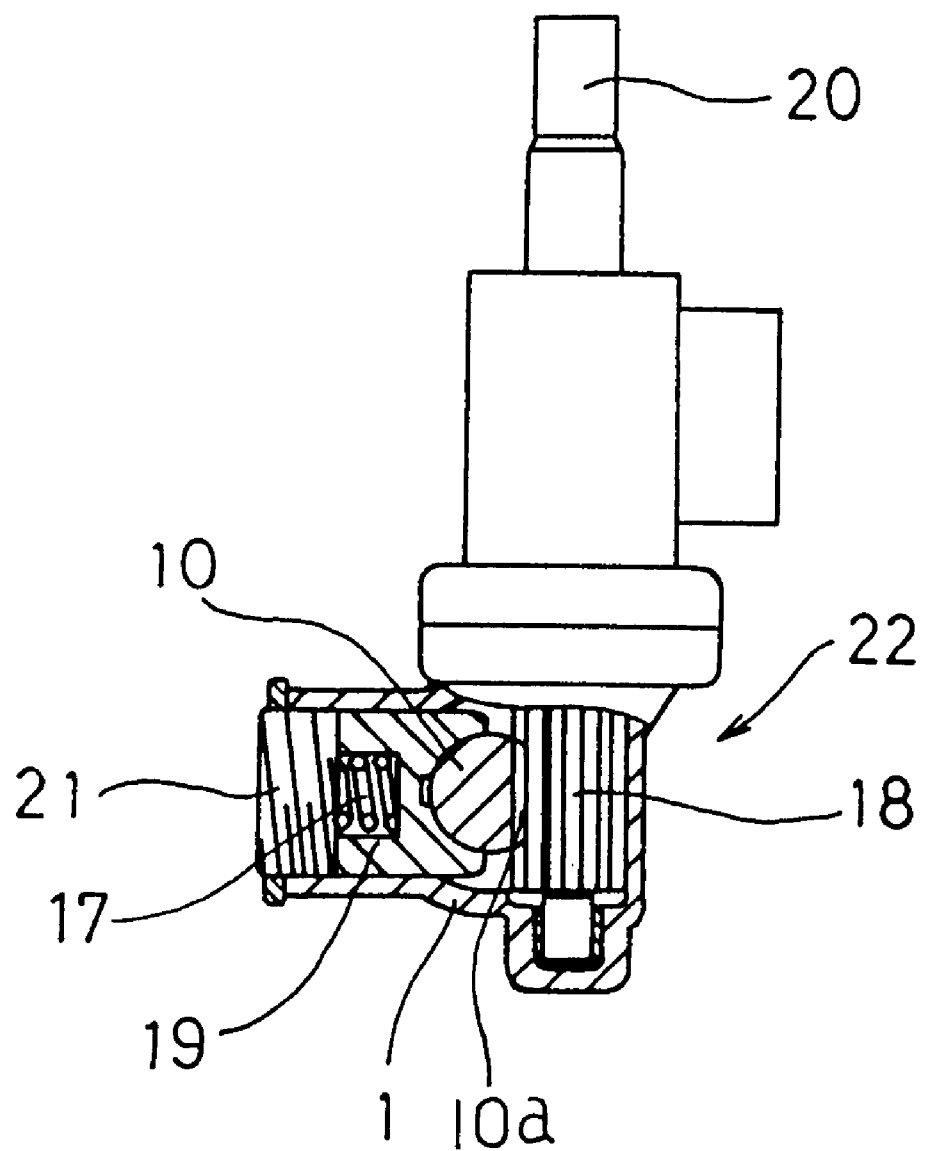
FIG. 2 is a partial diagrammatic view showing the engagement between a main portion of a rack and pinion mechanism of the rack and pinion steering device according to the embodiment.
Figure 3:
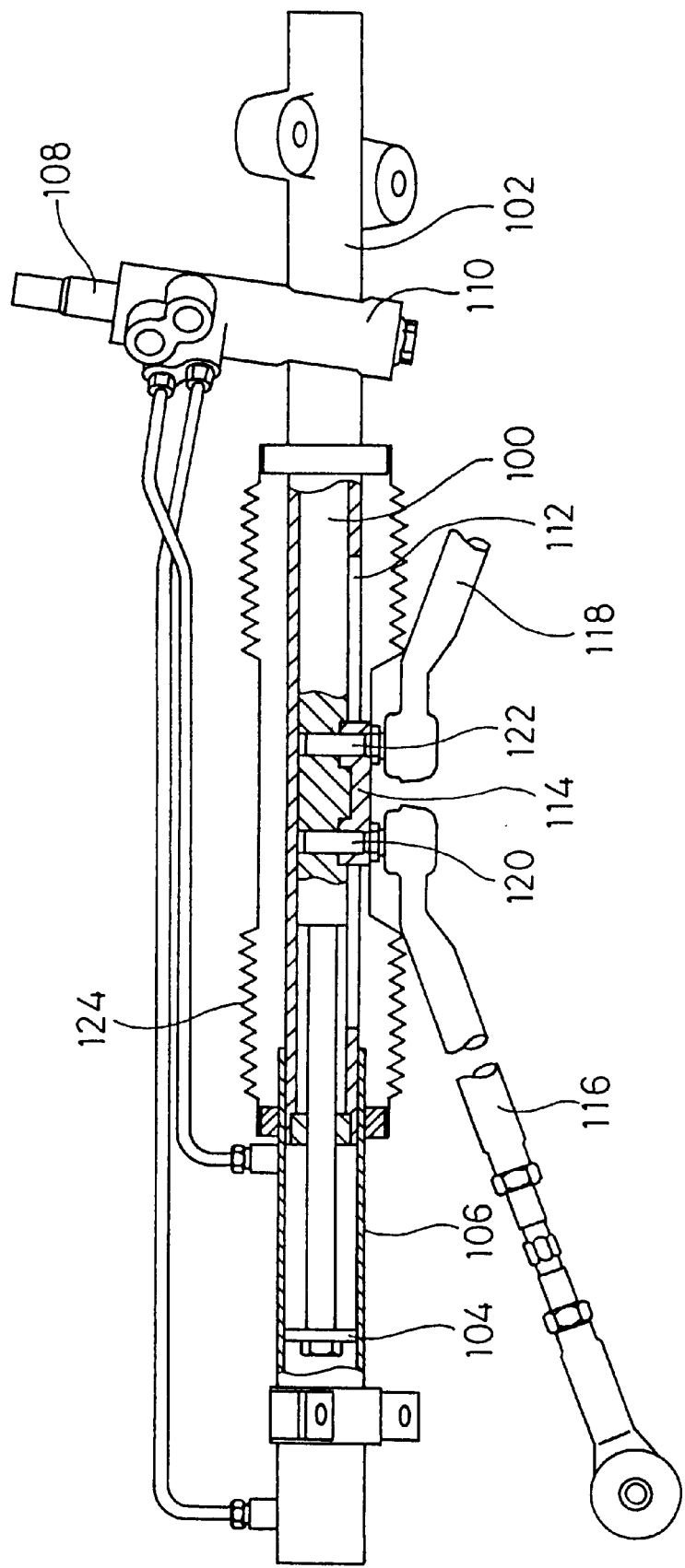
FIG. 3 is a partial sectional view of a conventional rack and pinion steering device.

As shown in FIG. 2, rack teeth 10a, formed on the rack shaft 10, are engaged with a pinion gear 18, which is rotatably supported by the device unit 1. The pinion gear 18 is rotated by the rotation of an input shaft 20. A bushing 19, biased by a spring 17, abuts on the outer peripheral portion of the rack shaft 10 opposite to the rack teeth 10a.

In this manner, a suitable clearance between the engagement between the rack teeth 10a and the pinion gear 18, required so that the rack shaft 10 can smoothly slide inside the device unit 1, is regulated by a plug 21, abutting bushing 19 and spring 17, being screwed into the device unit 1. Accordingly, the rack shaft 10, the spring 17, the pinion gear 18, the bushing 19, the input shaft 20, and the plug 21 together constitute a rack and pinion mechanism 22.

As shown in FIG. 1, operation oil is supplied to and discharged from the sliding hole 6, via a pair of pipes 24 and 26, in accordance with the size of a load which is produced when the input shaft 20 is rotated by the operation of a steering wheel (not shown). The resulting hydraulic pressure, in response to the load, is exerted onto the piston 12 to assist the linear motion of the rack shaft 10. Alternatively, the linear motion of the rack shaft 10 may be assisted by an electromotive motor.

In a preferred embodiment, a pair of legs 28 and 30 protrude from the device unit 1 in a direction orthogonal to the rack shaft 10. Attached to the legs 30 and 28 are bearings 32 and 34, which slidably support, parallel to the rack shaft 10, an auxiliary shaft 36. Connected to the auxiliary shaft 36, between the legs 28 and 30, are opposite tie rods 38 and 40, via ball joints 42 and 44, respectively.

Shanks 46 and 48, of the ball joints 42 and 44, are inserted into the auxiliary shaft 36, and fixed by nuts 50 and 52. Spherical portions 54 and 56, of the ball joints 42 and 44, are arranged along axial lines of the opposite tie rods 38 and 40, so that centered about the spherical portions 54 and 56 the opposite tie rods 38 and 40 can swing three-dimensionally.

A connecting member 58 is fixed to one end of the auxiliary shaft 36 by a bolt 57. A spherical portion 60, formed on one end of the rack shaft 10, is swingably connected to the connecting member 58, and is prevented from being disconnected by a caulking process.

Additionally, device unit 1 has three covers. A first cap or cover 62 is attached to one end of the device unit 1 to cover the rack shaft 10, the auxiliary shaft 36 and the connecting member 58. A second cover 64 is attached to the other end of the device unit 1 for covering the rack shaft 10, while a third cover 66 is attached to the leg 28 for covering the other end of the auxiliary shaft 36. Moreover, bellows 68 and 70 are also provided between the legs 28 and 30 for covering the auxiliary shaft 36.

The operation of the aforementioned rack and pinion steering device of the embodiment will now be described.

When the steering wheel (not shown) is operated, the pinion gear 18 is rotated by the input shaft 20. Thereby, causing the rack shaft 10 to slide in an axial direction, and thus, converting the rotary motion of the pinion gear 18 into a linear motion. Accordingly, that linear motion of the rack shaft 10 allows the auxiliary shaft 36 to linearly move parallel to the rack shaft 10 via the spherical portion 60 and the connecting member 58. Therefore, by the linear motion of the auxiliary shaft 60, a set of wheels (not shown) are turned, via the ball joints 42 and 44 and the opposite tie rods 38 and 40.

In this manner, the opposite tie rods 38 and 40 are pushed from the side of the wheels by the reaction of the steering wheel at the time of operation, and the kickback of the wheels at the time of driving. As such, a rotary moment centered about the axial direction is exerted on the auxiliary shaft 36, via the ball joints 42 and 44.

However, since the auxiliary shaft 36 is connected to the rack shaft 10 by the connecting member 58, the rotation of the auxiliary shaft 36 is regulated. Therefore, when the rotary moment is applied to the auxiliary shaft 36, unusual sounds or vibrations are thus prevented from occurring.

Additionally, since the connecting member 58 is connected to the rack shaft 10, via the spherical portion 60, the rotation of the auxiliary shaft 36 is not transmitted between the connecting member 58 and the rack shaft 10. Furthermore, because the rotary moment is not exerted onto the rack shaft 10, the engagement between the rack teeth 10a and the pinion gear 18 is not influenced. In this manner, the rotary moments fail to interact with each other, allowing the clearance for the engagement between the rack teeth 10a and the pinion gear 18 to be adjusted, by the bushing 19 and the plug 21, to an optimum clearance without fear of being influenced by the other components.

It is to be appreciated that the auxiliary shaft 36 can also be provided with vibration damping, effected by adjusting the inner dimensions of the bearings 32 and 34 to obtain the optimum clearance and by adjusting the friction therebetween. Also, in the preferred embodiment, the auxiliary shaft 36 is slidably supported by the bearings 32 and 34, but may be slidably supported, for example, only by the bearing 34.

Since the tie rods 38 and 40 and the auxiliary shaft 36 are interconnected via the ball joints 42 and 44, respectively, friction is prevented from being enlarged even if the stroke of the rack shaft 10 is enlarged. Moreover, since the ball joints 42 and 44 are interposed between the bearings 32 and 34, a sufficient rigidity is obtained, thereby also preventing deterioration of this rigidity.

As aforementioned, in the rack and pinion steering device, the unusual sounds or vibrations are also advantageously prevented from being generated because the rotation of the auxiliary shaft is regulated by connecting the auxiliary shaft to the rack shaft by the connecting member.

It is understood that the invention is not limited to the embodiment described above, as various modifications may be made without departing from the scope of the invention.

What is claimed is:

1. A rack and pinion steering device which converts a rotary motion of a steering wheel into turning movement of a set of wheels, said steering device comprising:

a linearly movable rack shaft, the linear motion of the rack shaft turning the set of wheels, an auxiliary shaft slidably supported parallel to said rack shaft, a connecting member for interconnecting ends of said auxiliary shaft and said rack shaft, said connecting member having a spherical portion formed on the end of said rack shaft and swingably engaged in said connecting member to interconnect the end of said rack shaft and said connecting member to prevent the transmission of rotary movement between said auxiliary shaft and said rack shaft, and ball joints having spherical portions disposed along axial lines of tie rods to interconnect said tie rods and said auxiliary shaft, said auxiliary shaft being slidably supported by a pair of bearings which are disposed at a predetermined interval on a device unit, and said tie rods and said auxiliary shaft are interconnected between said pair of bearings to securely support said ball joints.

2. The rack and pinion steering device according to claim 1 wherein said auxiliary shaft is slidably supported by said device unit which supports said rack shaft in such a manner that the rack shaft can move linearly.

3. The rack and pinion steering device according to claim 1 wherein said rack shaft and said connecting member are enclosed in said device unit.

4. A rack and pinion steering device which converts a rotary motion of a steering wheel into turning movement of a set of wheels, said steering device comprising:

a linearly movable rack shaft, the linear motion of the rack shaft turning the set of wheels, an auxiliary shaft slidably supported parallel to said rack shaft;

a connecting member to interconnect ends of said auxiliary shaft and said rack shaft and having a spherical portion formed on a second end of said rack shaft swingably engaging said connecting member to prevent the transmission of rotary movement between said auxiliary shaft and said rack shaft, and abutting means to adjust an engagement clearance between teeth formed adjacent a first end of said rack shaft and a gear of said rack and pinion mechanism.

5. The rack and pinion steering device according to claim 4 wherein ball joints are disposed along axial lines of tie rods for rotatably connecting said tie rods to said auxiliary shaft.

6. The rack and pinion steering device according to claim 4 wherein said rack shaft and said auxiliary shaft are slidably supported by a device unit.

7. The rack and pinion steering device according to claim 6 wherein a pair of bearings are disposed at a predetermined interval on said device unit to slidably support said auxiliary shaft, said tie rods and said auxiliary shaft are interconnected between said pair of bearings.

8. The rack and pinion steering device according to claim 6 wherein said device unit has cylindrical walls defining a sliding hole with an opening, and an end member being inserted into said opening to seal a piston provided on said rack shaft within said sliding hole, said end member slidably supporting said rack shaft and allowing a protruding portion adjacent the second end of said rack shaft to move in and out of said device unit in response to the linear motion.

9. The rack and pinion steering device according to claim 8 wherein the linear motion of said rack shaft is assisted by a hydraulic pressure from said rack and pinion mechanism acting on said piston.

10. The rack and pinion steering device according to claim 4 wherein said auxiliary shaft is slidably supported by a pair of bearings which are disposed at a predetermined interval on said device unit, said tie rods and said auxiliary shaft are interconnected between said pair of bearings, and bellows are provided around said auxiliary shaft between said pair of bearing and said ball joints.

11. The rack and pinion steering device according to claim 8 wherein a portion of the auxiliary shaft, said protruding portion of said rack shaft, and said connecting member are enclosed in said device unit by a cap.

12. The rack and pinion steering device according to claim 4 wherein said abutting means is a bushing abutting said rack shaft on a side opposed to said teeth, and a screw cap abutting a spring which biases the spring against said bushing.

* * * * *